Patented Sept. 9, 1947

2,427,326

UNITED STATES PATENT OFFICE 2,427,326

TREATMENT OF MINERAL OIL EMULSIONS

Paul M. Goodloe, II, Little Neck, N. Y., and Thomas T. Noland, United States Navy, assignors to Socony-Vacuum Oil Company, Incorporated, a corporation of New York No Drawing. Application February 13, 1945, Serial No. 577,722

8 Claims. (Cl. 252—334)

1

This invention relates generally to the treatment of emulsions of the water-in-oil type, and is more particularly concerned with a process and composition for treating mineral oil emulsions of the water-in-oil type for effecting the separation of their constituent parts into oil and water.

As is well known to those familiar with the art, petroleum emulsions are generally more or less stable systems in which droplets of water or water having various mineral salts dissolved therein are dispersed in a somewhat permanent state throughout the oil. The oil constitutes the continuous phase of the system.

In accordance with the prior art, these petroleum emulsions have been separated into their constituents by treatment with demulsifying agents or emulsion breakers, which comprise active emulsion-breaking agents, frequently a "water-soluble" wetting agent, that are well known in the art and compounded so as to be stable under wide variations of temperature and pumpable under field conditions. For this purpose, the active emulsion-breaking agents have been compounded generally with relatively large amounts of alcohols or combinations of anhydrous alcohols and aromatic solvents, and water. In practice, the water content of these emulsion breakers has been kept as low as possible in order to prevent separation of the constituent parts and to diminish the possibilities of freezing which would render pumping substantially impossible from an economic and practical standpoint.

It is also well known in the art, that a considerable portion of the crude oil produced comes from hard water districts. The water of the emulsions of these districts contains calcium and magnesium salts. It is well established that these salts aid in stabilizing the water-in-oil emulsions. However, in some cases, treatment with water softening agents alone has effected resolution of the emulsions into their constituent parts. In other cases, the water softening agents have been effective only when used in conjunction with surface-active wetting agents. However, in the latter cases, the water softening agents have shown a tendency to cause a "salting out" of the colloidal surface-active wetting agents. The alcohols and solvents referred to hereinbefore have not been satisfactory in bringing

2 about stabilization of emulsion breakers containing water softening agents such as phosphates, silicates, and the like.

The disadvantages of using the emulsion breakers of the prior art therefore, have been fourfold. In the first place, the large amounts of alcohols or of anhydrous alcohols employed in the mixtures have made the cost of these emulsion breakers inordinately high; secondly, some of these emulsion breakers have nevertheless always manifested a tendency to be unstable at temperatures usually encountered in the field; thirdly, some of these emulsion breakers have nevertheless been known to freeze readily; and fourth, some of the emulsion breakers containing water softening agents have manifested a tendency to be unstable.

We have now found that a satisfactory emulsion-breaking composition or emulsion breaker which is stable within wide limits of temperature variation can be prepared by incorporating suitable amounts of urea into an aqueous "solution" of an active emulsion-breaking agent.

We have also found that a satisfactory emulsion-breaking composition containing appreciable quantities of water softening agents and which is stable within wide limits of temperature variation can be prepared by incorporating suitable amounts of urea therewith.

We have discovered that urea lowers the temperature at which active emulsion-breaking agents separate from aqueous "solutions" thereof and that this temperature varies inversely with the amount of urea employed.

Accordingly, it is an object of the present invention to provide a process for treating mineral oil emulsions of the water-in-oil type. Another is to afford a composition for treating mineral oil emulsions. A very important object is to provide a composition for treating mineral oil emulsions of the water-in-oil type for effecting the separation of their constituent parts into mineral oil and water. A more specific object is to provide a process for achieving the foregoing objects, which comprises treating the mineral oil emulsions of the character described hereinbefore with emulsion breakers that include active emulsion-breaking agents and urea. Other objects and advantages of the present invention will become apparent to those skilled in the art from the following description.

Broadly stated, the present invention provides a process for separating mineral oil emulsions of the water-in-oil type into their constituent parts, which comprises subjecting an emulsion to the action of an emulsion breaker containing a colloidally active substance which normally tends to stabilize emulsions of the oil-in-water type, water, and urea. It must be clearly understood, however, that the emulsion breakers of our invention may or may not contain water softening agents.

In accordance with our invention, when the emulsion is permitted to remain in a quiescent state after the treatment, or is subjected to other equivalent procedural steps, the water or water having various mineral salts dissolved therein and the oil will form separate and distinct phases which can be individually recovered as is well known in the art.

The active emulsion-breaking agents employed in the emulsion breakers used in our process are those ordinarily employed in the emulsion breakers of the prior art. As stated hereinbefore, these active emulsion-breaking agents are well known and generally speaking, comprise colloidally active substances which tend to stabilize emulsions of the oil-in-water type. These include colloidally active substances which normally are considered to be oil-soluble, as well as those that normally are considered to be distinctly water-soluble. From a practical standpoint, it must be understood that these colloidally active substances in order to be colloidally active must possess some solubility in both water and oil. Broad classes of these substances are water-soluble soaps, synthetic detergents, and mixtures of soaps, petroleum fractions, and water. Sodium, potassium, and ammonium salts of fatty acids, such as stearic acid, oleic acid, and palmitic acid; sodium, potassium, and ammonium naphthenates; and free sulfonic acids as well as their salts including "oil-soluble" and "water-soluble" sulfonates, such as sodium, potassium, and ammonium salts of sulfonic acids including sulfonated fatty acids and petroleum sulfonic acids, may be mentioned by way of non-limiting examples of the active emulsion-breaking agents suitable for our purpose.

To the best of our knowledge, the most useful emulsion-breaking agents of the prior art have been the "water-soluble wetting agents," and preferably, the water-soluble sulfonates. In this connection, it must be understood that when we speak of "water-soluble wetting agents," we have reference to all surface- active polar chemicals which tend to produce emulsions of the oil-in-water type. Ordinarily, it is these materials which are most useful in breaking crude oil emulsions of the water-in-oil type. Accordingly, we have found that a mixture consisting for instance of 50% sodium sulfonates (prepared by neutralizing the sulfonic acids obtained by treating mineral oils containing substantial amounts of cyclic hydrocarbons, especially the solvent tars produced therefrom, with a sulfonating agent of sufficient strength to produce brown sulfonic acids, salts of which are highly water-soluble and oil-insoluble, with sodium hydroxide, in accordance with the process described in Patent Number 2,-266,084), 35% water, and 15% intermediate naphtha constitutes an excellent example of an active emulsion-breaking agent suitable for our purpose.

However, as is well known in the art, in most cases and to achieve best results, such water-soluble wetting agents must be slightly modified with small amounts of sulfonic acids, cresylic acids, "oil-soluble" sulfonates, ammonium naphthenates, and the like.

The amounts of emulsion-breaking agent to be used in the compositions of our invention generally will be determined by the solubility of the emulsion-breaking agent in pure water and to a considerable extent, by the form in which these agents occur as by-products, since cost is highly important. As a general rule, the emulsion breakers should contain as high a percentage of emulsion-breaking agent as is compatible with the practice in the field, i. e., pumping, handling, etc., since it is the emulsion-breaking agent that is the active ingredient of our compositions. Ordinarily, this means a content of emulsion-breaking agent varying between about 20% and about 50% by weight.

The amount of water to be used may vary within wide limits. It is well known that in conventional demulsifying practice, the active emulsion-breaking agents are employed ordinarily in ratios of about 1 part of agent to 10,000 and even 30,000 parts of emulsion. Accordingly, the amount of water to be used in compounding the emulsion breaker depends, as stated hereinbefore, primarily upon the solubility of the active emulsion-breaking agent in water, as well as the amounts of active emulsion-breaking agent required to effect the desired demulsification, to be pumped into the emulsion per unit of time. The water-content of our emulsion breakers may vary suitably between about 90% and about 10% by weight, without any noticeable difference in results obtained, provided that appropriate amounts of emulsion breaker are employed, and ordinarily, varies between about 25% and about 75% by weight.

The amounts of urea to be used in the emulsion breakers of our invention may vary within wide limits, depending primarily upon the temperatures at which the emulsion breaker is to be employed, and secondly, upon the amount of water used in compounding the emulsion breaker. As stated hereinbefore, the temperature at which the water-soluble wetting agents separate from aqueous solutions thereof, other variables remaining constant, varies inversely with the amounts of urea employed. For obvious economic reasons, the amount to be used in any particular case should be the lowest possible which is capable of maintaining fluidity over the desired temperature range. For maximum protection, tests have shown that the urea content of our emulsion breakers should be approximately about one-half that of the active emulsion-breaking agent. Ordinarily, the urea content of our emulsion breakers varies between about 5% and about 25% by weight. We have found in practice that the emulsion breakers should contain at least about 5% by weight of urea in order to lower the cloud point temperature or the temperature at which the active emulsion-breaking agent separates out, to temperatures ordinarily encountered in the field. For example, the mixture already referred to, i. e., 50% sodium sulfonates prepared as described hereinbefore, 35% water, and 15% intermediate naphtha, was converted from a slimy jelly to a clear liquid by stirring with 30 parts of dry urea. Dilution of this liquid with 30 parts of water produced a bright, clear liquid which remained stable and fluid at temperatures of 0° F. as well as 150° F.

In practicing our process, a demulsifying agent of the character described hereinbefore, is brought into contact with the emulsion to be treated in any manner and in any apparatus commonly used for this purpose in the art. This procedure may be used alone or in combination with other demulsifying processes generally known.

In order to further illustrate the advantages of our invention, the following data are given:

| Emulsion Breaker No. | Emulsion-breaking Agent | | Water-softening Agent | | Water, per cent by weight | Urea, per cent by weight | Cloud Point, °F. |
|---|---|---|---|---|---|---|---|
| | Type | Per cent by weight | Type | Per cent by weight | | | |
| 1 | The oil-free salts of the sulfonic acids obtained by subjecting Coastal distillate having a Saybolt Universal viscosity at 100° F. of 54-57 seconds, to a plurality of treatments with 98% sulfuric acid in a ratio of one barrel of oil to 50 lbs. of acid. | 10 | | | 90 | | 70 |
| 2 | ----do---- | 30 | | | 50 | 20 | -5 |
| 3 | ----do---- | 30 | | | 55 | 15 | 0 |
| 4 | ----do---- | 30 | $Na_4P_2O_7$ | 3 | 52 | 15 | 0 |
| 5 | ----do---- | 25 | $Na_4P_2O_7$ | 2.5 | 55.8 | 16.7 | 10 |
| 6 | An aqueous dispersion of sulfonates produced by treating a naphthenic distillate having a Saybolt Universal viscosity at 100° F. of about 55 seconds, with 98% sulfuric acid, separating the sludges, and recovering the sulfonic acids from the oil layer by water extraction to yield a so-called "acid jelly." The latter is neutralized with caustic soda, the mixture is allowed to settle, and the clear liquid is separated. This liquid analyzed 19.6% of petroleum sulfonates. | 100 | | | | | 55 |
| 7 | ----do---- | 96 | | | | 4 | 20 |
| 8 | ----do---- | 92 | | | | 8 | 15 |
| 9 | The material obtained by monochlorinating a paraffinic kerosene and using this product to alkylate benzene through the Friedel-Crafts reaction. The resulting alkyl benzenes are sulfonated and the product of sulfonation is neutralized with caustic soda. | 40 | | | 40 | 20 | 0 |
| 10 | ----do---- | 40 | $Na_4P_2O_7$ | 2.5 | 37.5 | 20 | 0 |

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the appended claims.

We claim:

1. A process for separating mineral oil emulsions of the water-in-oil type into their constituent parts, which comprises subjecting an emulsion to the action of an emulsion breaker which includes a colloidally active organic substance which tends to stabilize emulsions of the oil-in-water type, water, and urea.

2. A process for separating mineral oil emulsions of the water-in-oil type into their constituent parts, which comprises subjecting an emulsion to the action of an emulsion breaker which includes an active emulsion-breaking agent selected from the group consisting of the sodium, potassium, and ammonium salts of soap-forming fatty acids, of sulfonated soap-forming fatty acids, of naphthenic acids, and of petroleum sulfonic acids; water; and urea.

3. A process for separating mineral oil emulsions of the water-in-oil type into their constituent parts, which comprises subjecting an emulsion to the action of an emulsion breaker which includes a water-soluble metal salt of petroleum sulfonic acids obtained by treating mineral oils containing substantial amounts of cyclic hydrocarbons with sulfonating agents of sufficient strength to produce brown sulfonic acids, salts of which are water-soluble and oil-insoluble, but of insufficient strength to produce any substantial amounts of sulfonic acids, salts of which are oil-soluble; water; and urea.

4. A process for separating mineral oil emulsions of the water-in-oil type into their constituent parts, which comprises subjecting an emulsion to the action of an emulsion breaker which includes a water-soluble metal salt of petroleum sulfonic acids obtained by treating mineral oils containing substantial amounts of cyclic hydrocarbons with sulfonating agents of sufficient strength to produce brown sulfonic acids, salts of which are water-soluble and oil-insoluble, but of insufficient strength to produce any substantial amounts of sulfonic acids, salts of which are oil-soluble; water; and urea in amounts varying between about 5% and about 25% by weight.

5. A process for separating mineral oil emulsions of the water-in-oil type into their constituent parts, which comprises subjecting an emulsion to the action of an emulsion breaker which includes a water-soluble metal salt of petroleum sulfonic acids obtained by treating mineral oils containing substantial amounts of cyclic hydrocarbons with sulfonating agents of sufficient strength to produce brown sulfonic acids, salts of which are water-soluble and oil-insoluble, but of insufficient strength to produce any substantial amounts of sulfonic acids, salts of which are oil-soluble, in amounts varying between about 20% and about 50% by weight; water in amounts varying between about 25% and about 75% by weight; and urea in amounts varying between about 5% and about 25% by weight.

6. A composition of matter which comprises a water-soluble metal salt of petroleum sulfonic acids obtained by treating mineral oils contining substantial amounts of cyclic hydrocarbons with sulfonating agents of sufficient strength to produce brown sulfonic acids, salts of which are water-soluble and oil-soluble, but of insufficient strength to produce any substantial amounts of sulfonic acids, salts of which are oil-soluble; water; and urea.

7. A composition of matter which comprises a water-soluble metal salt of petroleum sulfonic acids obtained by treating mineral oils containing substantial amounts of cyclic hydrocarbons with sulfonating agents of sufficient strength to produce brown sulfonic acids, salts of which are water-soluble and oil-insoluble, but of insufficient strength to produce any substantial amounts of sulfonic acids, salts of which are oil-soluble; water; and urea in amounts varying between about 5% and about 25% by weight.

8. A composition of matter which comprises a water-soluble metal salt of petroleum sulfonic acids obtained by treating mineral oils containing substantial amounts of cyclic hydrocarbons with sulfonating agents of sufficient strength to produce brown sulfonic acids, salts of which are water-soluble and oil-insoluble, but of insufficient strength to produce any substantial amounts of sulfonic acids, salts of which are oil-soluble, in amounts varying between about 20% and about 50% of weight; water in amounts varying between about 25% and about 75% by weight; and urea in amounts varying between about 5% and about 25% by weight.

PAUL M. GOODLOE.
THOMAS T. NOLAND.

REFERENCES CITED

The following references are of record in the file of this patent:

UNITED STATES PATENTS

| Number | Name | Date |
| --- | --- | --- |
| 1,596,596 | DeGroote et al. | Aug. 17, 1926 |
| 1,716,347 | Riehl et al. | June 4, 1929 |
| 1,889,960 | Hintzmann | Dec. 6, 1932 |
| 1,938,322 | DeGroote et al. | Dec. 5, 1933 |
| 1,938,323 | DeGroote et al. | Dec. 5, 1933 |
| 2,246,085 | Arnold | June 17, 1941 |
| 2,266,084 | Sachanen et al. | Dec. 16, 1941 |

FOREIGN PATENTS

| Number | Country | Date |
| --- | --- | --- |
| 407,039 | Great Britian | Mar. 2, 1934 |

OTHER REFERENCES

Dunstan et al., Colloids in Petroleum and in the Petroleum Industry, article in the Journal of the Society of Chemical Industry, vol. XLIV, page 439T, Aug. 28, 1925.

Dow, Methods Used for Dehydration of Oil-Field Emulsions, Bureau of Mines Report of Investigations No. 2688, pages 7, 8, and 9, May 1925.

Certificate of Correction

Patent No. 2,427,326.                                September 9, 1947.

PAUL M. GOODLOE, II, ET AL.

It is hereby certified that errors appear in the printed specification of the above numbered patent requiring correction as follows: Column 2, line 38, after "Another" insert *object*; column 6, line 58, for "oil-soluble" read *oil-insoluble*; and that the said Letters Patent should be read with these corrections therein that the same may conform to the record of the case in the Patent Office.

Signed and sealed this 11th day of November, A. D. 1947.

[SEAL]

THOMAS F. MURPHY,
*Assistant Commissioner of Patents.*